United States Patent
Wang et al.

(10) Patent No.: US 11,440,217 B2
(45) Date of Patent: Sep. 13, 2022

(54) APPARATUS AND METHOD FOR PREPARING A BUILDING STRUCTURE WITH 3D PRINTING

(71) Applicant: CHINA BUILDING MATERIALS ACADEMY, Beijing (CN)

(72) Inventors: Zhendi Wang, Beijing (CN); Ling Wang, Beijing (CN); Xia Zhao, Beijing (CN)

(73) Assignee: CHINA BUILDING MATERIALS ACADEMY, Beijing (CN)

( * ) Notice: Subject to any disclaimer, the term of this patent is extended or adjusted under 35 U.S.C. 154(b) by 0 days.

(21) Appl. No.: 16/644,826

(22) PCT Filed: May 19, 2019

(86) PCT No.: PCT/CN2019/086786
§ 371 (c)(1),
(2) Date: Mar. 5, 2020

(87) PCT Pub. No.: WO2020/113907
PCT Pub. Date: Jun. 11, 2020

(65) Prior Publication Data
US 2020/0391409 A1    Dec. 17, 2020

(30) Foreign Application Priority Data
Dec. 7, 2018    (CN) .......................... 201811497996.6

(51) Int. Cl.
*B28B 23/00*    (2006.01)
*B33Y 10/00*    (2015.01)
(Continued)

(52) U.S. Cl.
CPC .......... *B28B 23/0062* (2013.01); *B28B 1/001* (2013.01); *B28B 17/00* (2013.01);
(Continued)

(58) Field of Classification Search
CPC ........... B28B 1/00; B28B 1/001; B28B 23/02; B28B 23/0006; B28B 23/0062;
(Continued)

(56) References Cited

U.S. PATENT DOCUMENTS 5,764,521 A * 6/1998 Batchelder .............. B29C 41/36
                                                            700/196
6,221,295 B1 * 4/2001 Kaiser ................... B29C 70/525
                                                            156/180
(Continued)

FOREIGN PATENT DOCUMENTS

CN    105625720 A    6/2016
CN    106738190 A    5/2017
(Continued)

OTHER PUBLICATIONS

Machine English Translation of KR-20180016100-A (Year: 2018).*
(Continued)

*Primary Examiner* — Francisco W Tschen
*Assistant Examiner* — Edgaredmanuel Troche
(74) *Attorney, Agent, or Firm* — Dinsmore & Shohl LLP

(57) ABSTRACT

Provided is an apparatus for preparing a building structure with 3D printing, comprising: a 3D printing device (1), having a storage chamber (11) and a printing head (12) connected to the storage chamber (11) and being movable relative to a base frame; and a reinforcing device, movably disposed relative to the base frame, and having a driving mechanism (3) for driving short rebars or short ribs to perform an insertion movement in a direction intersected with a stacking direction of a cement-based slurry layer; the driving mechanism inserts the short rebars or the short ribs into an interlayer interface spanning at least two adjacent cement-based slurry layers printed by the 3D printing device (1). Also provided a method for preparing a building struc-
(Continued)

ture with 3D printing. There is no printing gap between the cement-based slurry layer printed by the apparatus and the inserted rebars, ensuring a tight connection between the cement slurry and the rebars, so that the mechanical properties and toughness of the interlayer interface between the cement-based materials of the 3D printing are truly improved.

7 Claims, 7 Drawing Sheets

(51) Int. Cl.
*B33Y 30/00* (2015.01)
*B33Y 40/00* (2020.01)
*B28B 1/00* (2006.01)
*B28B 17/00* (2006.01)

(52) U.S. Cl.
CPC ............... *B33Y 10/00* (2014.12); *B33Y 30/00* (2014.12); *B33Y 40/00* (2014.12)

(58) Field of Classification Search
CPC ..... B28B 17/00; B29B 23/00; B29B 23/0062; B33Y 10/00; B33Y 30/00; B33Y 40/00; B33Y 70/00; B28C 17/00; E04G 2021/049
USPC ........................................................ 264/138
See application file for complete search history.

(56) References Cited

U.S. PATENT DOCUMENTS

| | | | |
|---|---|---|---|
| 7,153,454 B2 * | 12/2006 | Khoshnevis | B29C 64/118 |
| | | | 264/34 |
| 10,920,434 B1 * | 2/2021 | Pearson, Jr. | B25J 5/02 |
| 2008/0078226 A1 * | 4/2008 | Anagnostopoulos | B21D 11/12 |
| | | | 72/307 |
| 2008/0263978 A1 * | 10/2008 | Abou-Saleh | E04C 5/06 |
| | | | 52/260 |
| 2015/0108677 A1 * | 4/2015 | Mark | B29C 64/165 |
| | | | 264/138 |
| 2015/0290875 A1 * | 10/2015 | Mark | B29C 64/118 |
| | | | 264/138 |
| 2017/0021527 A1 | 1/2017 | Grivetti et al. | |
| 2017/0203468 A1 * | 7/2017 | Sherman | E04B 1/35 |
| 2018/0195285 A1 * | 7/2018 | Smith | E04C 5/07 |

FOREIGN PATENT DOCUMENTS

| | | | | |
|---|---|---|---|---|
| CN | 108312291 A | | 7/2018 | |
| CN | 108407040 A | | 8/2018 | |
| EP | 3638473 A1 | | 4/2020 | |
| KR | 20180016100 A | * | 2/2018 | |
| KR | 101856642 | | 5/2018 | |
| WO | 2018136475 A1 | | 7/2018 | |
| WO | WO-2019038491 A | * | 2/2019 | ............... B28B 3/20 |
| WO | WO-2019038491 A1 | * | 2/2019 | ............. B28B 1/001 |

OTHER PUBLICATIONS

Machine English Translation of WO-2019038491-A1 (Year: 2019).*
Office Action for Chinese Patent Application No. 201811497996.6, dated Jul. 22, 2019. (English Translation herewith).
European Patent Office, Extended European Search Report issued in corresponding European application No. 19894132.0, dated Dec. 14, 2021, 10 pp.

* cited by examiner

APPARATUS AND METHOD FOR PREPARING A BUILDING STRUCTURE WITH 3D PRINTING

CROSS REFERENCE TO RELATED APPLICATIONS

This application is a National Phase Entry of International Application No. PCT/CN2019/086786, entitled "APPARATUS AND METHOD FOR PREPARING A BUILDING STRUCTURE WITH 3D PRINTING" and filed on May 14, 2019, which claims priority to Chinese Patent Application No. 201811497996.6 filed on Dec. 7, 2018, entitled "apparatus and method for preparing a building structure with 3D printing", the entire contents of both are incorporated herein by reference.

TECHNICAL FIELD

The present application relates to a field of engineering construction, in particular to an apparatus and a method for preparing a building structure with 3D printing.

BACKGROUND 3D printing is usually achieved using a digital technology material printer. It is often used in the manufacture of models in the fields such as mould manufacturing and industrial design, and is gradually used for the direct manufacture of some products. There are already some parts printed by this technology. The technology is also applied in the fields such as jewelry, footwears, industrial designs, constructions, engineering and construction (AEC), automobiles, aerospaces, dental and medical industries, educations, geographic information systems, civil engineering, firearms and others. 3D printing with cement-based materials has broad prospects in the fields such as constructions, manufacture of complex structures, formation and manufacture of functional materials, and future unmanned constructions in extreme conditions.

In the existing construction field, apparatus for preparing a building structure by 3D printing mainly includes a 3D printer. During preparing the building structure, the cement-based slurry filled in a liquid storage chamber in the 3D printer is extruded layer by layer on a building substrate through a printing head. Since the height of a layer of cement-based slurry printed by the 3D printer is limited, 3D printed building component is shown as forming stacking cement-based slurry layers on the building substrate, and then the building structure is formed after the cement-based slurry layers are cured. Since there is an interface between adjacent layers in different layers of cement-based slurry, an interlayer interface of each cement-based slurry layer has poor bonding strength and toughness. When the interlayer interface is subjected to external driving force, the interlayer interface of the adjacent cement-based slurry layers is delaminated and debonded, resulting in that the building structure prepared by the cement-based slurry is prone to damage or collapse which is a safety hazard.

In the prior art, rebars are used as a skeleton. One use of the rebars skeleton in rebars concrete is to enhance joint strength of concrete poured in different batches. However, for the technical solution of the 3D printed building component, when the 3D printer is printing near the rebars preset as in the prior art, the rebars will block the running path of the 3D printer printing head, so that the printing head needs to print around the rebars. In view of the fact that the 3D printing cement-based materials themselves are required to be vertically stacked, the cement slurry printed by the printing head cannot be automatically leveled in the horizontal direction to fill into the gap between rebars as the self-leveling concrete of the traditional construction. When the existing 3D printing is used to prepare the building structure, there is a gap between the cement-based slurry printed from the printing head and the rebars, resulting in an inability to form an organic bond, so that the rebars concrete of the conventional construction cannot be formed. Therefore, an organic bond of the rebars and the 3D printed concrete cannot be substantially formed, using the conventional method of setting rebars in prior art, and the mechanical properties and toughness of the interlayer interface of the 3D printed cement-based material cannot be truly improved.

SUMMARY

Therefore, the technical problem to be solved by the present application is that in the building structure prepared by apparatus for preparing building structure with 3D printing in the prior art, the interlayer interface of the cement-based material has poor mechanical bonding performance.

In order to solve the above technical problems, the present application provides an apparatus for preparing a building structure with 3D printing, comprising:

a 3D printing device, having a storage chamber and a printing head connected to the storage chamber and being movable relative to a base frame;

a reinforcing device, movably disposed relative to the base frame, and having a driving mechanism for driving short rebars or short ribs to perform an insertion movement in a direction intersected with a stacking direction of a cement-based slurry layer; the driving mechanism inserts the short rebars or the short ribs into an interlayer interface spanning at least two adjacent cement-based slurry layers printed by the 3D printing device.

Preferably, in the above apparatus for preparing a building structure with 3D printing, the reinforcing device further comprises a temporary storage mechanism;

the temporary storage mechanism has a storage cavity for arranging the short rebars or the short ribs extending along the direction intersected with the stacking direction of the cement-based slurry layer and slidably arranged in lines and in a direction parallel to the cement-based slurry layer; the storage cavity is provided with a feed port and a discharge port, and a retaining port opposite to the discharge port;

the driving mechanism extends into the retaining port to drive the short rebars or the short ribs sliding to the discharge port of the storage cavity out of the storage cavity to perform the insertion movement.

Further preferably, in the above apparatus for preparing a building structure with 3D printing, the temporary storage mechanism comprises:

a casing, having the storage cavity;

a first driving plate, disposed in the feed port;

a first elastic member, fixedly disposed with respect to the casing and coupled to the first driving plate; the first driving plate is pushed into the storage cavity by pressing of the first elastic member.

Further preferably, in the above apparatus for preparing a building structure with 3D printing, the casing has a placement cavity with both ends arranged as the feed port (511) and a first outlet (512) respectively and being along a sliding direction of the short rebars or the short ribs; and a discharge channel (514) communicated with the first outlet (512) and extending vertically; the retaining port (515) and the discharge port (516) are arranged at a top and a bottom of the discharge channel (514), respectively;

the placement cavity and the discharge channel together define the storage cavity.

Further preferably, in the above apparatus for preparing a building structure with 3D printing, the placement cavity is tilted downward from the feed port towards the first outlet.

Further preferably, in the above apparatus for preparing a building structure with 3D printing, the reinforcing device further comprises a cutting component having at least one cutter head for cutting long rebars or long ribs into the short rebars or the short ribs.

Further preferably, in the above apparatus for preparing a building structure with 3D printing, the cutting component (2) further comprises a sleeve fixedly disposed relative to the driving mechanism and through which the long rebars or long ribs pass;

the cutter head, driven by the first driver, slides along an axis perpendicular to the sleeve and abuts on an end surface of the sleeve for extending short rebars or short ribs.

Further preferably, in the above apparatus for preparing a building structure with 3D printing, the reinforcing device further comprises a straightening mechanism having a linear passage extending in the conveying direction of the long rebars or the long ribs and through which the long rebars or long ribs pass, to adjust a horizontality or verticality of the long rebars or long ribs.

Further preferably, in the above apparatus for preparing a building structure with 3D printing, the straightening mechanism comprises a first roller set and a second roller set sequentially disposed;

wherein the first roller set has at least two first rollers disposed oppositely and alternately; the second roller set has at least two second rollers disposed oppositely and alternately; an axis of the first roller is perpendicular to that of the second roller, and the linear passage is formed between the two first rollers and between the two second rollers.

Further preferably, in the above apparatus for preparing a building structure with 3D printing, the reinforcing device further comprises a bending mechanism for bending at least one end of the short rebars or the short ribs, after cutting by the cutting component, parallel to the stacking direction of the cement-based slurry layer towards the direction intersected with the stacking direction of the cement-based slurry layer, and the driving mechanism drives the short rebars or the short ribs bended to perform an insertion movement.

Further preferably, in the above apparatus for preparing a building structure with 3D printing, the bending mechanism comprises:

a clamp, for clamping short rebars or short ribs;

at least one of a bending member, disposed on one side of the clamp;

at least one of a second driver, coupled to the bending member for driving the bending member to press against an end of the short rebars or the short ribs to perform a bending movement with respect to a portion of the short rebars or the short ribs clamped by the clamp.

Further preferably, in the above apparatus for preparing a building structure with 3D printing, the bending mechanism comprises two bending members, separately disposed on two sides of the clamp.

Further preferably, in the above apparatus for preparing a building structure with 3D printing, a receiving groove with a slot facing the clamp is provided on an end surface of each of the bending members facing a side of the clamp; when the bending member moves with the at least one of the second driver, the receiving groove is embedded with a bended portion of short rebars or short ribs.

Also provided is a method for preparing a building structure with 3D printing, comprising the steps of:

S1: placing a cement-based slurry in a storage chamber of the 3D printing device;

S2: printing at least one layer of a cement-based slurry layer onto a substrate, as a printing head of the 3D printing device moves over the substrate;

S3: before the cement-based slurry layer is hardened, inserting short rebars or short ribs into an interlayer interface spanning at least two adjacent cement-based slurry layers printed by the 3D printing device, by using a reinforcing device, in a direction intersected with a stacking direction of the cement-based slurry layer, such that the top of the short rebars or the short ribs may not exceed the top of the cement-based slurry layer where the short rebars or the short ribs are located, or a height H1 that the top of the short rebars or the short ribs exceeds the top of the cement-based slurry layer where the short rebars or the short ribs are located, is less than a layer height H0 that the 3D printing device prints a next layer of cement-based slurry layer;

S4: curing the cement-based slurry layer to form a building structure.

Preferably, the above method for preparing a building structure with 3D printing further comprises cutting long rebars or long ribs into the short rebars or the short ribs by using a cutting component, before or after the step S3.

Further preferably, the above method for preparing a building structure with 3D printing further comprises bending both ends of the short rebars or the short ribs relative to a middle portion of the short rebars or the short ribs to form an inverted U-shape or an inverted L-shape, by using a bending mechanism, before the step S3; in the step S3, the inverted U-shaped or the inverted L-shaped short rebars or short ribs are inserted into the cement-based slurry layer.

Further preferably, the above method for preparing a building structure with 3D printing further comprises using the above apparatus for preparing a building structure with 3D printing.

The technical solution provided by the present application has the following advantages.

1. The apparatus for preparing a building structure with 3D printing provided by the present application, comprising: a 3D printing device, having a storage chamber and a printing head connected to the storage chamber and being movable relative to a base frame; a reinforcing device, movably disposed relative to the base frame and having a driving mechanism for driving short rebars or short ribs to perform an insertion movement in a direction intersected with a stacking direction of a cement-based slurry layer; the driving mechanism inserts the short rebars or the short ribs into an interlayer interface spanning at least two adjacent cement-based slurry layers printed by the 3D printing device.

In the apparatus for preparing a building structure with 3D printing, firstly 3D printing device prints cement-based slurry layers layer-by-layer, and then the short rebars or the short ribs are inserted into the interlayer interface of the adjacent cement-based slurry layers through the reinforcing device, thereby connecting the adjacent cement-based slurry layers. When the interface is subjected to the external driving force in the direction parallel to the cement layer, there is no relative movement between the cement-based slurry layers under the connection force of the short rebars or the short ribs, thereby improving the connection strength and toughness between the printing layers, so as to ensure the connection stability between layers of the interface, and improve a safety of the building. In addition, since the action of inserting the short rebars or the short ribs into the interlayer interface is performed after at least one layer of cement-based slurry layer is laid, there is no printing gap between the printed cement-based slurry layer and the inserted rebars, ensuring the tight connection between the cement slurry and the rebars, so that the mechanical bonding property of the interlayer interface of the 3D printed cement-based material are truly improved.

2. In the apparatus for preparing a building structure with 3D printing provided by the present application, the reinforcing device further comprises a temporary storage mechanism; the temporary storage mechanism has a storage cavity for arranging the short rebars or the short ribs extending along the direction intersected with the stacking direction of the cement-based slurry layer and slidably arranged in lines and in a direction parallel to the cement-based slurry layer. The short rebars or the short ribs are horizontally slidably disposed in the storage cavity, and are driven by the driving mechanism to extend out of the storage cavity when sliding to the front end of the storage cavity to perform the insertion movement. The apparatus for preparing a building structure with 3D printing, by disposing the temporary storage mechanism of the reinforcing device, pre-stores the short rebars or the short ribs in the storage cavity of the temporary storage mechanism. After the short rebars or the short ribs slid to the front end of the storage cavity, they are driven, by the driving mechanism, one by one to be inserted into and at least span the interlayer interface obtained by 3D printing. The temporary storage mechanism is disposed to further improve the efficiency of the short rebars or short ribs in performing the insertion movement.

3. The apparatus for preparing a building structure with 3D printing provided by the present application further comprises a cutting component having a sleeve and at least one cutter head for cutting long rebars or long ribs into short rebars or short ribs. The sleeve is fixedly disposed relative to the driving mechanism and through which the long rebars or long ribs pass. The cutter head, driven by the first driver, slides along an axis perpendicular to the sleeve and abuts on an end surface of the sleeve for extending the short rebars or the short ribs.

In the apparatus for preparing a building structure with 3D printing, the cutting component is disposed to cut the long rebars or the long ribs, set in a roll, into a length required for the corresponding 3D printing process, ensuring that the short rebars or short ribs formed after cutting have a preset length. The sleeve is disposed in the cutting component to ensure the stability of the conveying process and the straightness of the rebars when the long rebars or the long ribs are conveyed to the cement-based slurry layer; and to effectively prevent the movement of the cutting position due to mechanical vibration as the movement of the cutter head when the cutter head abuts against the sleeve to cut the long rebars, further improving the stability of the cutter head when performing the cutting operation at the preset length position; in addition, when the cutting length needs to be adjusted, only the position of the sleeve needs to be adjusted, which improves the convenience of the use process.

4. In the apparatus for preparing a building structure with 3D printing provided by the present application, the reinforcing device further comprises a straightening mechanism having a linear passage extending in the conveying direction of the long rebars or the long ribs and through which the long rebars or long ribs pass, to adjust a horizontality or verticality of the long rebars or long ribs. In the apparatus for preparing a building structure with 3D printing, the straightening mechanism is disposed to make the rebars stretched in a straight line after the long rebars set in a roll pass through the straightening mechanism, so as to ensure the straightness of the short rebars or the short ribs finally inserted into the cement-based slurry layer, further ensure the stability of the interlayer bonding between cement-based slurry layers when the short rebars or the short ribs are inserted into the interlayer interface of the cement-based slurry layer.

5. In the apparatus for preparing a building structure with 3D printing provided by the present application, the reinforcing device further comprises a bending mechanism for bending at least one end of the short rebars or the short ribs parallel to the stacking direction of the cement-based slurry layer, after cutting by the cutting component, towards the direction intersected with the stacking direction of the cement-based slurry layer, and the driving mechanism drives the short rebars or the short ribs bended to perform an insertion movement.

In the apparatus for preparing a building structure with 3D printing, the bending mechanism is disposed to obtain short rebars or short ribs having at least one end extending in the direction intersecting with the interlayer interface. The short rebars or the short ribs are inserted into the interlayer interface to play the role of connecting interlayer interface between at least two adjacent layers. At the same time, the short rebars or the short ribs also have a portion with at least one end parallel to the direction of the interlayer interface, the setting of which is favorable for improving the tensile strength of the interlayer interface perpendicular to the cement-based slurry layer, so as to further improve the stability of the building structure.

6. In the apparatus for preparing a building structure with 3D printing provided by the present application, the bending mechanism comprises a clamp, for clamping the short rebars or the short ribs; a bending member, disposed on one side of the clamp; a second driver, coupled to the bending member for driving the bending member to press against an end of the short rebars or the short ribs to perform a bending movement with respect to a portion of the short rebars or the short ribs clamped by the clamp. There are two extending members disposed on both sides of the clamp, respectively.

In the apparatus for preparing a building structure with 3D printing, when the bending member clamps the short rebars or the short ribs to make the bending movement, two extending members disposed on both sides of the clamp are used to obtain inverted U-shaped short rebars or short ribs. The two mutually parallel portions of the U-shaped short rebars or short ribs are inserted along the direction intersecting with the interlayer interface and at least span the two adjacent cement-based slurry layers. The inverted U-shaped short rebars or short ribs also have a connecting portion that connects two parallel portions, to ensure a fixed relative position of the rebars, thereby improving the relative stability of the rebars when inserted. In addition, the connecting portion is arranged in parallel with the cement-based slurry layer, thereby increasing a tensile strength perpendicular to the interlayer interface of cement-based slurry layer and a shear strength parallel to the interlayer interface to further improve the stability of the building structure.

7. The method for preparing a building structure with 3D printing provided by the present application, comprises the steps of: S1: placing a cement-based slurry in a storage chamber of the 3D printing device; S2: printing at least one layer of a cement-based slurry layer onto a substrate, as a printing head of the 3D printing device moves over the substrate; S3: before the cement-based slurry layer is hardened, inserting short rebars or short ribs into an interlayer interface spanning at least two adjacent cement-based slurry layers printed by the 3D printing device, by using a reinforcing device, in a direction intersected with a stacking direction of the cement-based slurry layer, and enabling the top of the short rebars or the short ribs not to exceed the top of the cement-based slurry layer where the short rebars or the short ribs are located, or a height H1 that the top of the short rebars or the short ribs exceeds the top of the cement-based slurry layer where the short rebars or the short ribs are located, is less than a layer height H0 that the 3D printing device prints a next layer of cement-based slurry layer; S4: curing the cement-based slurry layer to form a building structure.

In the method for preparing a building structure with 3D printing, since the cement-based material for 3D printing has different thixotropy from conventional cement materials, it can be vertically stacked. In addition, the cement-based material used in 3D printing has a higher yield stress than the cement-based material used in conventional casting method. Therefore, in the case that each layer of cement-based slurry layer is printed without external mechanical orbiting of 3D printing, during performing 3D printing of the $n^{th}$ layer, the short rebars or the short ribs are inserted directly into the hardened cement-based slurry layer through the reinforcing device, which would not affect the printed $n^{th}$ layer, $(n-1)^{th}$ layer or $(n-2)^{th}$ layer, and any other layer of cement-based slurry layers below the $n^{th}$ layer, but still ensure curing process of the subsequent $n^{th}$ layer, $(n-1)^{th}$ layer or $(n-2)^{th}$ layer and any other layer of cement-based slurry layer below the $n^{th}$ layer. Correspondingly, when the $(n+1)^{th}$ layer, the $(n+2)^{th}$ layer or other layer of cement-based slurry layer laid over the $n^{th}$ layer is subsequently printed, or the reinforcing device continues to insert the short rebars or the short ribs, the short rebars or the short ribs sequentially planted and any layer of the cement-based slurry layer laid over the $n^{th}$ layer would not affect the vertical stacking and the curing effect of the $n^{th}$ layer, thereby achieving the stability of the building structure formed by 3D printing.

In addition, by limiting the length that the short rebars or the short ribs exceeds the cement-based slurry layer, no higher than the preset layer height H0 of the next layer of cement-based slurry layer to be printed, the printing head is not obstructed and affected by the short rebars and the short ribs when printing in the preset direction. In the 3D printing process, the cement slurry layer completely covers the top of the short rebars or the short ribs, thus achieving the purpose of uniformly printing the cement-based slurry layer. After completing printing, the short rebars or the short ribs are organically combined with the cement-based materials to truly enhance and improve mechanical properties and toughness of the interlayer interface.

DESCRIPTION OF THE DRAWING

In order to more clearly illustrate the technical solutions of the embodiments of the present application or the prior art, the drawings used in the embodiments of the present application or the prior art will be briefly described below. Obviously, the drawings in the following description are only some embodiments of the present application, and those skilled in the art can obtain other drawings based on these drawings without any creative efforts.

Figure 1:
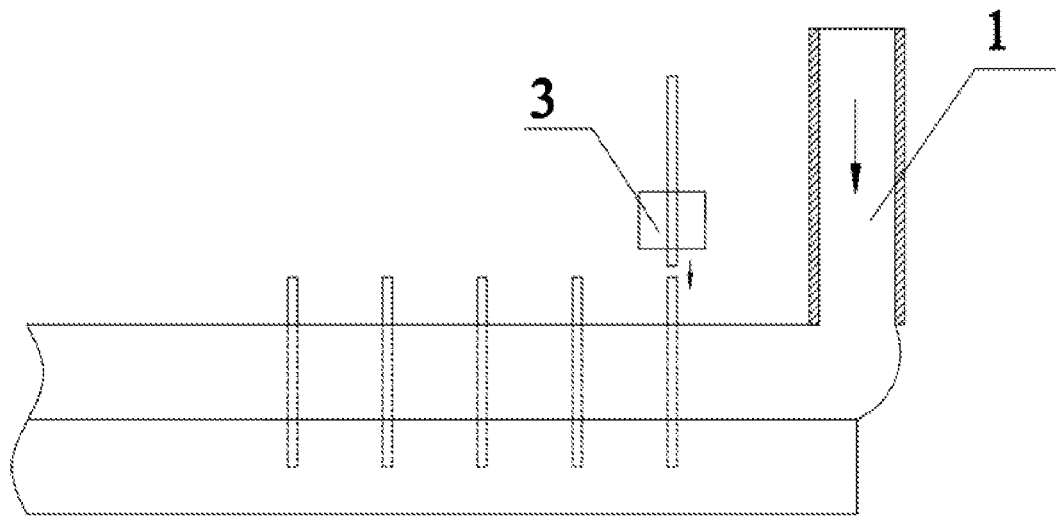
FIG. 1 is a schematic view of an apparatus for preparing a building structure with 3D printing according to the present application.

In the figures, the reference numerals are:
1—3D printing device; 11—storage chamber; 12—printing head;
2—cutting component; 21—sleeve; 22—cutter head;
3—driving mechanism; 31—second elastic member; 32—third driving plate; 321—plate body; 322—extending portion; 33—limiting groove; 331—vertical portion; 332—horizontal portion;
4—straightening mechanism; 41—first roller; 42—second roller;
51—casing; 511—feed port; 512—first outlet; 513—placement cavity; 514—discharge channel; 515—retaining port; 516—discharge port; 52—first driving plate; 53—first elastic member;
6—bending mechanism; 61—clamp; 62—bending member; 621—receiving groove;
7—feeding mechanism.

DETAILED DESCRIPTION

The technical solutions of the present application will be described clearly and completely with reference to the accompanying drawings. It is obvious that the described embodiments are only a part of the embodiments of the present application, but not all of the embodiments. All other embodiments obtained by those skilled in the art based on the embodiments of the present application without any creative efforts are within the scope of the present application.

In the description of the present application, it should be noted that the orientation or positional relationship indicative of the terms such as "center", "upper", "lower", "left", "right", "vertical", "horizontal", "inside", "outside" is the orientation or positional relationship shown in the drawings, which is merely for the convenience of the description and the simplified description of the present application, and is not intended to indicate or imply that the device or component referred to has a specific orientation and is constructed and operated in a specific orientation. Therefore, it should not be construed as a limitation of the present application. Moreover, the terms "first," "second," and "third" are used for descriptive purposes only and are not to be construed as indicating or implying relative importance.

In the description of the present application, it should be noted that the terms such as "disposed", "bond/bonding", and "connected/connection" are to be understood broadly, unless otherwise clearly stipulated and defined, and may be, for example, fixedly connected, detachably connected, or integrally connected; mechanically connected or electrically connected; directly connected or indirectly connected through an intermediate medium, and may be internal communication between the two elements. The specific meanings of the above terms in the present application may be understood by those skilled in the art based on a particular case.

Further, the technical features involved in the different embodiments of the present application described below may be combined with each other as long as a conflict isn't constituted.

Example 1

Figure 2:
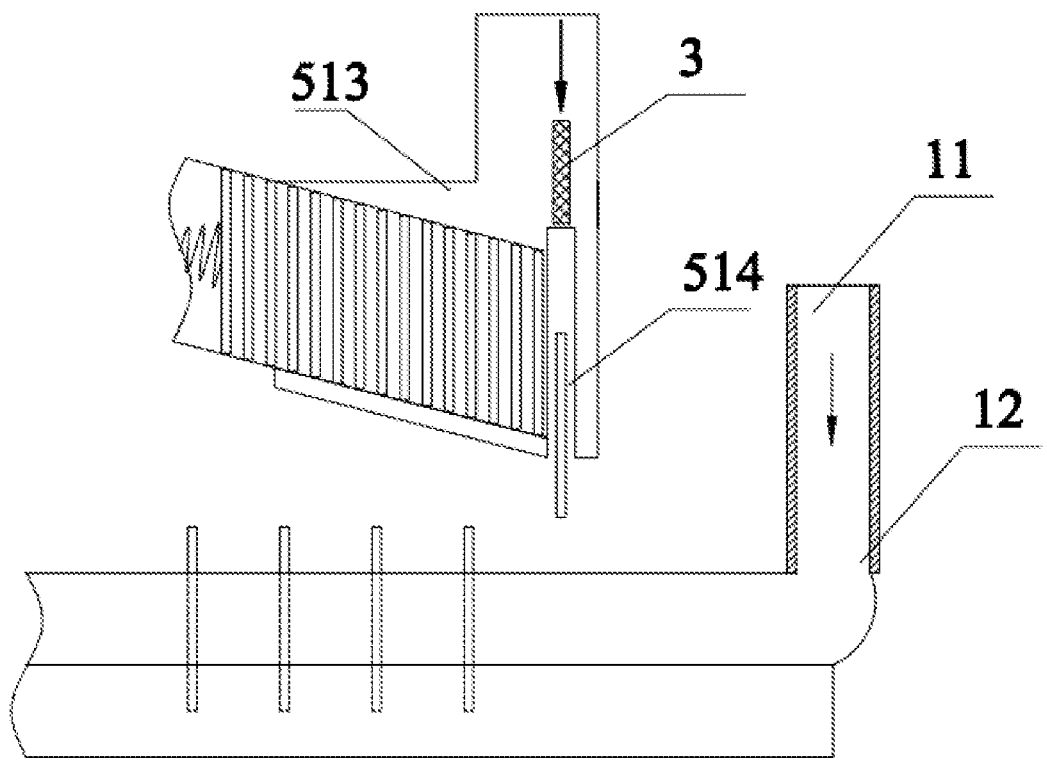
FIG. 2 is a schematic view of an apparatus for preparing a building structure with 3D printing in example 1.
Figure 3:
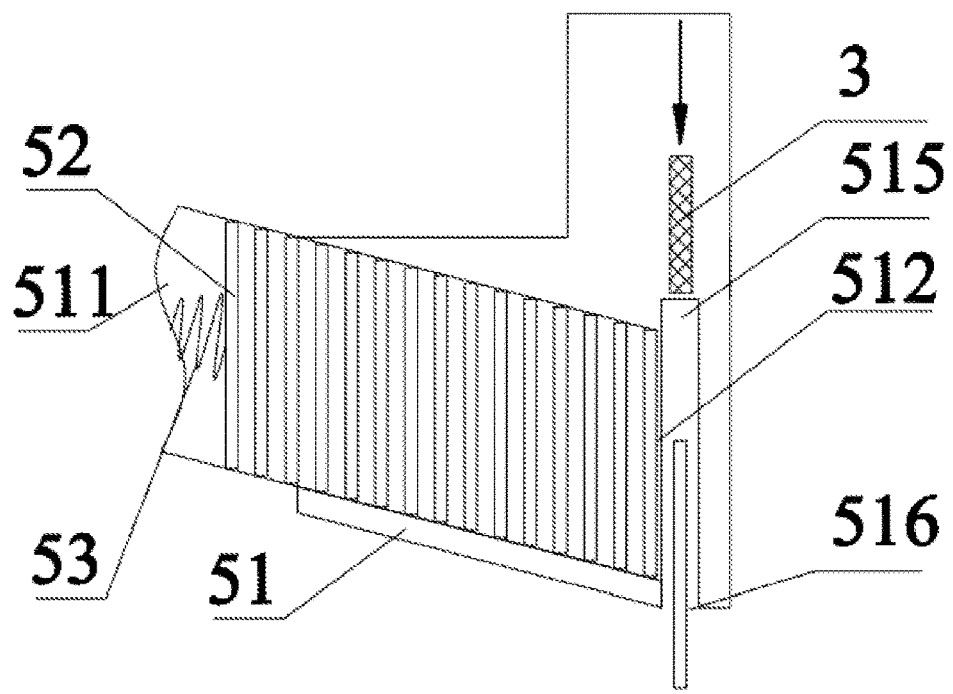
FIG. 3 is an enlarged schematic view of a temporary storage mechanism in example 1.

Example 1 provides an apparatus for preparing a building structure with 3D printing, as shown in FIGS. 2 and 3, comprising a 3D printing device 1 and a reinforcing device.

As shown in FIG. 2, the 3D printing device 1 has a storage chamber 11 used to hold cement-based materials to be printed, and a printing head 12 connected at an end of the storage chamber 11. The printing head 12 and the reinforcing device are movably disposed relative to a base frame respectively.

For example, the 3D printing device as a whole or the printing head is disposed on a moving mechanism, and is movable relative to the base frame by the moving mechanism. The moving mechanism may include an elevator, and a manipulator fixed on the elevator or a sliding member, optionally a cylinder, fixed on the elevator. The printing head is fixed on a telescopic shaft of the cylinder to realize the movement of the printing head of the 3D printing device relative to the base frame to print a cement-based slurry layer.

As shown in FIGS. 2 and 3, the reinforcing device has a temporary storage mechanism, a loading mechanism, and a driving mechanism 3. The temporary storage mechanism is used to store and output short rebars or short ribs; the loading mechanism is used to load the short rebars or the short ribs into the temporary storage mechanism; the driving mechanism 3 is used to drive the short rebars or the short ribs to perform an insertion movement in a direction intersected with a stacking direction of the cement-based slurry layer.

Specifically, the driving mechanism 3 drives the short rebars or the short ribs to insert into the cement-based slurry layer in a direction perpendicular to an interlayer interface of the cement-based slurry layers, further ensuring a maximum interlaminar connection force and a highest shear strength. Optimally, the driving mechanism 3 conveys the short rebars or the short ribs downwards in the vertical direction. The cement-based material is laid layer by layer by the 3D printing device 1 in the vertical direction.

In the example 1, the driving mechanism 3 includes a third driver moving up and down in a vertical direction and a second driving plate fixedly connected to the third driver. The third driver drives the second driving plate to move down in a vertical direction. The second driving plate abuts a top surface of the short rebars or the short ribs at its bottom, and drives a bottom surface of the short rebars to insert into the cement-based slurry layer until reaching a preset position as being driven by the third driver. For example, the third driver is an integrated structure of a linear guide and a cylinder arranged side-by-side, and the second driving plate is disposed on the same side of the cylinder and the linear guide. The second driving plate is fixedly connected to an end of a piston rod of the cylinder and a slider disposed on the linear guide. The linear guide is used to ensure a linear movement of the second driving plate, and the cylinder is used to provide a power source for a vertical movement of the driving mechanism 3.

As shown in FIGS. 2 and 3, the temporary storage mechanism in example 1 comprises a casing 51, a first driving plate 52 and a first elastic member 53. The casing 51 has a storage cavity used to hold the short rebars or the short ribs, and the storage cavity has a placement cavity 513 extending along the sliding direction of the short rebars or the short ribs, and a discharge channel 514 communicating with the placement cavity 513 in the vertical direction.

Specifically, the placement cavity 513 is provided with a feed port 511 and a first outlet 512 along the sliding direction of the short rebars or the short ribs, and the discharge channel 514 communicated with the first outlet 512. The discharge channel 514 has a retaining port 515 and a discharge port 516 at its top and bottom respectively. The first driving plate 52 is disposed in the feed port 511. One end of the first elastic member 53 is fixedly disposed with respect to the casing 51, and the other end is fixedly connected to the first driving plate 52, the first driving plate 52 is pushed by the first elastic member 53, into the placement cavity 513.

In example 1, the placement cavity 513 is tilted downward from the feed port 511 towards the first outlet 512. Furthermore, the short rebars or the short ribs disposed in the placement cavity 513 can be slid downward from the feed port towards the first outlet 512 under the action of gravity, so as to ensure a timely feeding for the discharge channel 514.

Specifically, the short rebars or the short ribs provided in example 1 are the short rebars or the short ribs which are segmented into fixed lengths, extend vertically and are horizontally arranged side by side in the storage cavity. Under a first pressing force of the first elastic member 53, the short rebars or the short ribs are slidably disposed in the storage cavity along the direction of the first pressing force. The driving mechanism 3 extends into the discharge channel 514 to drive the short rebars or the short ribs to perform the insertion movement in a vertical direction from the retaining port 515 to the discharge port 516 of the discharge channel 514. For example, the first elastic member 53 is a spring. The short rebars or the short ribs may be a single rebar extending in the vertical direction, or the rebars having two, three or four, and even more vertical portions extending vertically, which are connected by a connection structure.

In example 1, the loading mechanism includes a clamping assembly, a conveying assembly, and a limiting member. The clamping assembly has a clamping jaw for holding at least one of the short rebars or ribs, and the conveying assembly drives the clamping jaw to reciprocate in a feed box and the storage cavity in which the short rebars or the short ribs are placed, the limiting member is disposed at an end of the discharging port 515. When the loading mechanism loads the short rebars or the short ribs, the short rebars or the short ribs slide out of the storage cavity along the discharge port under the force of gravity.

For example, the clamping assembly is a clamping cylinder having two clamping portions that are relatively close to or away from each other. The two clamping portions form a clamping cavity for clamping at least one of the short rebars or the short ribs. The conveying assembly is three linear motors disposed in a three-stacked manner to ensure that the clamping assembly clamps slidably in three directions to make the clamping action automate. In actual use, firstly, the first elastic member 53 and the first driving plate 52 are removed in advance, and the limiting member is placed at an end of the discharge port 515. And then, the storage cavity is loaded with the short rebars or the short ribs by the loading mechanism. Finally, after loading a predetermined number of the short rebars or the short ribs, the first elastic member 53 and the first driving plate 52 are reinstalled and the limiting member is removed from the discharge port. At this point, the loading operation of loading the short rebars or the short ribs into the storage cavity is completed.

As in example 1, a single short rebar or short rib is clamped one by one. Of course, in an alternative example, once two, three or more short rebars or short ribs may be clamped successively to further improve the loading efficiency. In an alternative example, the clamping assembly and the conveying assembly can be integrated into an integral structure. The manipulator can be used to further improve the flexibility of the loading mechanism and the loading accuracy, so as to improve the use requirements of automation.

In the apparatus for preparing a building structure with 3D printing provided by example 1, 3D printing device 1 prints cement-based slurry layers via layer-by-layer, and then the short rebars or the short ribs are inserted into the interlayer interface of the adjacent cement-based slurry layers through the reinforcing device, thereby connecting the adjacent cement-based slurry layers. When the printed building structure is subjected to an external driving force in the direction parallel to the cement layer, an interlayer durability of the printing layer may be improved under the connection force of the short rebars or the short ribs, so as to ensure the stability of the connection of layer and layer in the interface, and improve a safety of the building. In addition, since the action of inserting the short rebars or the short ribs into the interlayer interface is performed after at least one cement-based slurry layer is laid, there is no printing gap between the printed cement-based slurry layer and the inserted rebars, ensuring the tight connection between the cement slurry and the rebars, so that the mechanical properties and durability of the interlayer interface of the 3D printed cement-based material are truly improved.

Example 1 also provides a method for preparing a building structure with 3D printing, comprising the following steps.

S11: A cement-based slurry is placed in a storage chamber 11 of a 3D printing device 1.

S12: A component model and parameters of the 3D printing device 1, such as a printing path, a printing rate, and a printing layer height of the 3D printer, and an interval and a depth of planting bars, and so on are preset;

S2: The $n^{th}$ layer (n=1, 2, 3 . . . ) of a cement-based slurry layer is printed onto a substrate, as a printing head 12 of the 3D printing device 1 moves over the substrate.

S31: A third driving plate drives short rebars or short ribs disposes in the discharge channel 514 in a vertical direction to move in a vertical direction, and the short rebars or the short ribs extend out of a discharge channel 514 through a discharge port 516.

S32: On the $n^{th}$ layer (n=1, 2, 3 . . . ) of the cement-based slurry layer, the second driving plate drives the short rebars or the short ribs to insert into at least the $n^{th}$ layer (n=1, 2, 3 . . . ), and ensuring that the height of the short rebars or the short ribs exceeding the top surface of the $n^{th}$ layer (n=1, 2, 3 . . . ) is smaller than the height of the printing head 12 when it prints the $(n+1)^{th}$ layer (n=1, 2, 3 . . . ). In the temporary storage mechanism, the short rebars or the short ribs disposed therein slide down along the inclined side toward the first outlet 512, and the short rebars or the short ribs disposed at the right end extending into the discharge channel 514, under a first pressing force of a first elastic member 53.

S33: The printing head 12 moves along the printing path, and continues to print the $n^{th}$ layer (n=1, 2, 3 . . . ) of the cement-based slurry layer, and continues to plant the short rebars or the short ribs on the $n^{th}$ layer (n=1, 2, 3 . . . ) according to the interval of the planting bars until the printing head 12 completes all of the moving path on the $n^{th}$ layer (n=1, 2, 3 . . . ) of the cement-based slurry layer.

S34: The height of the printing head 12, a relative position of the printing head 12 projected on the horizontal plane, and the moving path of the printing head 12 are adjusted according to the preset parameters of the 3D printing device 1. The $(n+1)^{th}$ layer (n=1, 2, 3 . . . ) of the cement-based slurry layer is laid and the short rebars or the short ribs are planted in the $(n+1)^{th}$ layer (n=1, 2, 3 . . . ) of the cement-based slurry layer. Returning to perform step S31 until the $(n+m)^{th}$ layer (n=1, 2, 3 . . . ) (m=1, 2, 3 . . . ) of the cement-based slurry layer is printed, and step S35 is performed after the short rebars or the short ribs are planted on the $(n+m)^{th}$ layer (n=1, 2, 3 . . . ) (m=1, 2, 3 . . . ) of cement-based slurry layer.

S35: A top layer is printed. The last layer of the cement-based slurry layer, i.e. the $(n+m+1)^{th}$ layer (n=1, 2, 3 . . . ) (m=1, 2, 3 . . . ) of the cement-based slurry layer, is printed on the printed $(n+m)^{th}$ layer (n=1, 2, 3 . . . ) (m=1, 2, 3 . . . ) of the cemented-based slurry layer. The printing head 12 moves along the preset printing path and performed 3D printing, ensuring that the top of the short rebars or the short ribs inserted in the $(n+m)^{th}$ layer (n=1, 2, 3 . . . ) (m=1, 2, 3 . . . ) is not higher than the top of the $(n+m+1)^{th}$ layer (n=1, 2, 3 . . . )(m=1, 2, 3 . . . ) of the cement-based slurry layer.

S4: After the preset $(n+m+1)^{th}$ layer (n=1, 2, 3 . . . ) (m=1, 2, 3 . . . ) of the cement-based slurry layer is printed, waiting for the cement-based slurry layer to cure to form a building structure. At this point, the process of 3D printing of the building structure is completed.

In the step S12, the 3D printing printing head 12 moves along the substrate according to the preset printing path. The printing rate of the 3D printer is the speed at which the printing head 12 moves along the preset path. The printing layer height is an interval of a vertical height of the interlayer interface between two adjacent cement layer-based slurry layers, for example, the printing layer height in example 1 is H0. The interval of the planting bars is a distance between adjacent short rebars or short ribs, the smaller the distance between the adjacent short rebars or short ribs is, the denser the interval of the planting bars on the same cement-based slurry layer is and the higher the interlayer bonding strength of the cement-based slurry layer is. The depth of the planting bar in example 1 is set according to the length of the short rebars or the short ribs, as long as a height H1 that the short rebars or the short ribs exceed the cement-based slurry layer when the short rebars or the short ribs are inserted, is less than a layer height H0 that the 3D printing device prints a next layer of cement-based slurry layer In the step S32, the short rebars or the short ribs may be inserted into the $n^{th}$ layer, the $(n-1)^{th}$ layer, the $(n-2)^{th}$ layer, and more of cement-based slurry layers, at this time only the height range that the short rebars or the short ribs exceed the top surface of the $n^{th}$ layer is limited. In addition, by limiting the length that the short rebars or the short ribs exceed the cement-based slurry layer, no higher than the layer height of the next layer of cement-based slurry layer to be printed, the printing head 12 is not obstructed and affected by the short rebars and the short ribs when printing in the preset direction, thus achieving the purpose of uniformly printing the cement-based slurry layer. After completing printing, the short rebars or the short ribs are combined with the cement-based materials to truly enhance and improve mechanical properties and toughness of an interface.

Figure 10A:
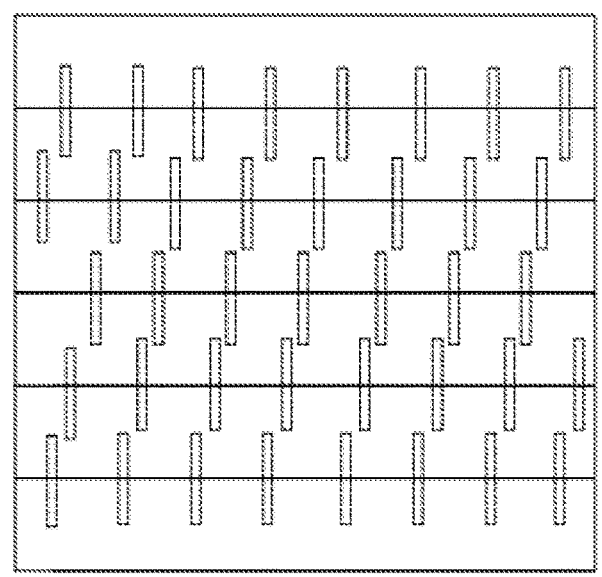
FIG. 10a is a schematic cross-sectional view showing the short rebars or the short ribs inserting into two adjacent cement-based slurry layers according to the present application.
Figure 10B:
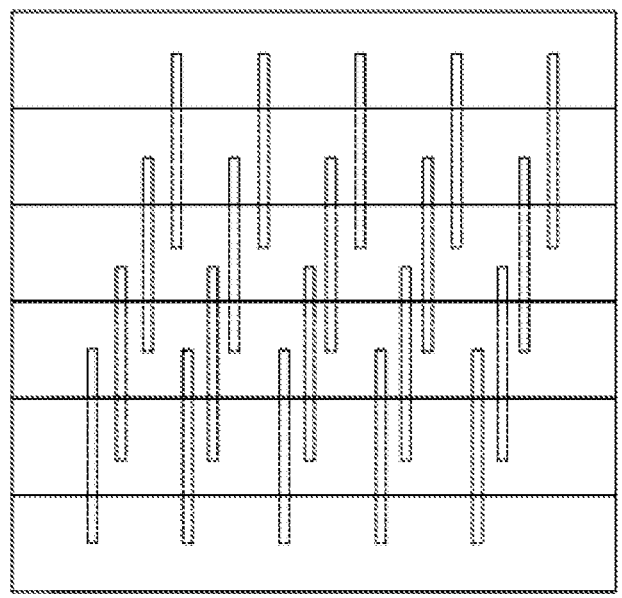
FIG. 10b is a schematic cross-sectional view showing the short rebars or the short ribs inserting into and spanning three adjacent cement-based slurry layers according to the present application.

In the step S32, as shown in FIGS. 10*a* and 10*b*, vertical strip-shaped short rebars or short ribs are vertically inserted into the $n^{th}$ layer of the cement-based slurry layer. It should be ensured that the short rebars or the short ribs at least span the interlayer interface between the $n^{th}$ layer and the adjacent $(n+1)^{th}$ layer of cement-based slurry layers.

Figure 10C:
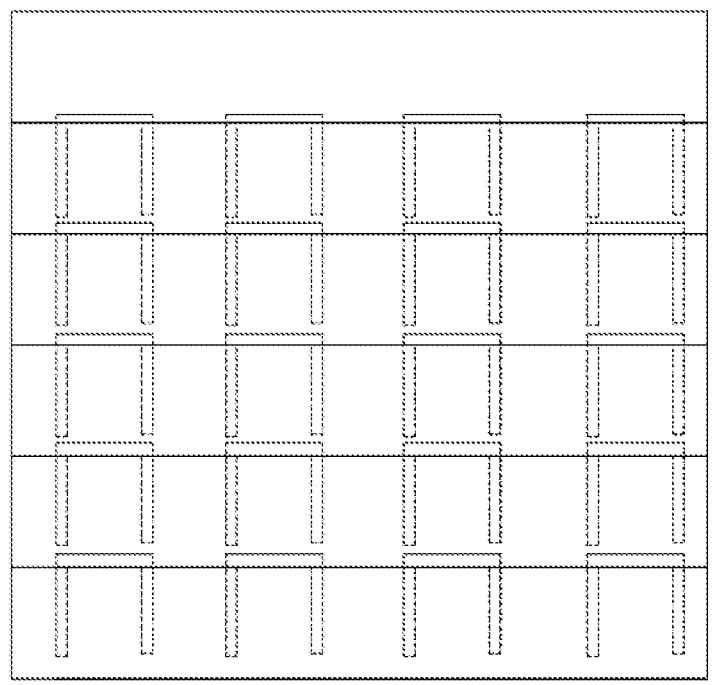
FIG. 10c is a schematic cross-sectional view showing inverted U-shaped short rebars or short ribs inserting into and spanning two adjacent cement-based slurry layers according to the present application.

In the step S32, as shown in FIG. 10*c*, inverted U-shaped short rebars or short ribs are used to insert into the $n^{th}$ layer of cement-based slurry layer. It should be ensured that a bottom surface of an inverted U-shaped middle portion abuts on a top surface of the $n^{th}$ layer of cement-based slurry layer, preventing a printing gap between the bottom surface of the middle portion and the top surface of the $n^{th}$ layer of cement-based slurry layer, ensuring a tight connection between the cement slurry layer and the rebars, so that the mechanical properties and toughness of the interlayer interface between the cement-based materials of the 3D printing are truly improved, further improving the safety and stability of the building structure.

In the step S32, the short rebars or short ribs with a M-shaped longitudinal section may be used to insert into the $n^{th}$ layer of cement-based slurry layer, and the M-shaped short rebars or the short ribs have three vertical portions in parallel, and a lateral connection portion that connects the three vertical portions in parallel at the tops thereof. It should be ensured that a bottom surface of the M-shaped lateral connection portion abuts against a top surface of the $n^{th}$ layer of cement-based slurry layer. The method of inserting M-shaped short rebars or short ribs is the same as the above method of inserting the inverted U-shaped short rebars or short ribs. Both of the methods may enhance the connection tightness between the cement-based slurry layer and the rebars, thereby improving the mechanical properties and toughness of the interlayer interface, and improving the safety and stability of the building structure.

In the step S34, for example, in the steps S31 and S32, when the vertical strip-shaped short rebars or short ribs are planted into the $n^{th}$ layer of cement-based slurry layer, the short rebars or the short ribs at least span the interlayer interface between the $n^{th}$ layer and the $(n+1)^{th}$ layer of cement-based slurry layers disposed adjacent. As shown in FIG. 10*a*, when the short rebars or the short ribs inserted in the step S31 are only inserted into the $n^{th}$ layer, the short rebars or the short ribs only span the interlayer interface between the $n^{th}$ layer and the $(n+1)^{th}$ layer. As shown in FIG. 10*b*, when the short rebars or the short ribs inserted in the step S31 are inserted into the $n^{th}$ layer and the $(n-1)^{th}$ layer, then in the step S33, the rebars may span both of interlayer interfaces between the $(n-1)^{th}$ layer and the $n^{th}$ layer and between the $n^{th}$ layer and the $(n+1)^{th}$ layer. Further, the short rebars inserted in step S31 insert more layers, thus vertically spanning the more interlayer interfaces of 3D printed cement-based slurry layer. Therefore, each of the short rebars or the short ribs inserted in the $n^{th}$ layer of cement-based slurry layer may have a shear effect on the interlayer interfaces spanned, further improving the interlayer connection force between the cement-based slurry layers and the mechanical properties between the layers, and further ensuring the stability of the building structure obtained by 3D printing.

In the step S34, the relative position of the printing head 12 is adjusted to ensure that the short rebars or short ribs are planted into the $(n+1)^{th}$ cement-based slurry layer, in the case that they does not interfere with the short rebars or the short ribs inserted in the $n^{th}$ layer of cement-based slurry layer. Therefore, a reliability of a planting action is improved, and at the same time, a planting position is dispersed to prevent the possibility that the same planting position causes the building structure to be broken due to stress concentration.

In the step S35, during 3D printing of the $(n+m+1)^{th}$ layer, the $(n+m)^{th}$ layer of cement-based slurry layer is inserted by the short rebars or the short ribs of which a top does not exceed the $(n+m+1)^{th}$ layer of cement-based slurry layer. The $(n+m+1)^{th}$ layer of cement-based slurry layer completely covers the top of the $(n+m)^{th}$ layer of short rebars or short ribs, ensuring that the short rebars or the short ribs are sealed and not exposed outside the cement-based material, improving the stability of the building structure.

In the method for preparing a building structure with 3D printing provided by example 1, since the cement-based material for 3D printing has different thixotropy from ordinary cement materials, it can be a vertical stacking forming. In addition, the cement-based material used in 3D printing has a higher yield stress than the cement-based material used in conventional casting method. Therefore, in the case there is no external mechanical orbiting for each layer of cement-based slurry layer printed by 3D printing, the short rebars or the short ribs inserted directly into an hardened cement-based slurry layer through the reinforcing device, which may not affect the printed $n^{th}$ layer, the $(n-1)^{th}$ layer or the $(n-2)^{th}$ layer, and any other layer of cement-based slurry layers below the $n^{th}$ layer, but still realize a curing process of the subsequent $n^{th}$ layer, $(n-1)^{th}$ layer or $(n-2)^{th}$ layer and any other layer of cement-based slurry layer below the $n^{th}$ layer. Correspondingly, when the $(n+1)^{th}$ layer, the $(n+2)^{th}$ layer or other layer of cement-based slurry layer laid over the $n^{th}$ layer is subsequently printed, or the reinforcing device continues to insert the short rebars or the short ribs, the short rebars or the short ribs planted in any layer of the cement-based slurry layer laid over the $n^{th}$ layer may still not affect the vertical stacking and the curing effect of the $n^{th}$ layer, thereby achieving the stability of the building structure formed by 3D printing.

As a first alternative embodiment, the third driver in example 1 may also be an integration of a motor and a lead screw, or an integration of a hydraulic cylinder and a linear guide, as long as the driving mechanism 3 drives the short rebars or the short ribs to insert vertically into the cement-based slurry layer.

Figure 4:
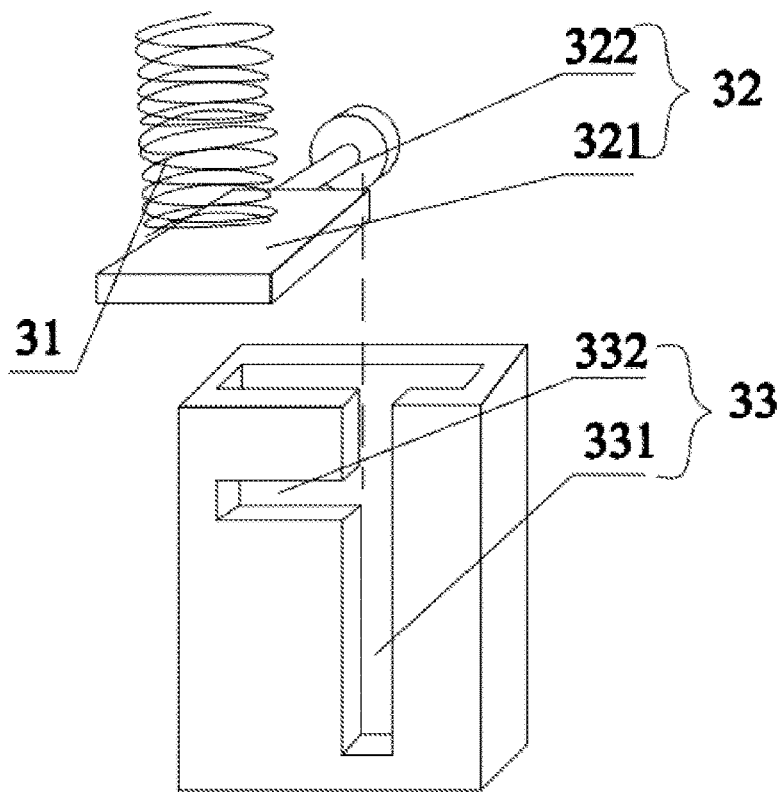
FIG. 4 is a schematic view of a driving mechanism in example 1.

As a second alternative embodiment, as shown in FIG. 4, the driving mechanism 3 has a second elastic member 31 and a third driving plate 32 which are sequentially disposed in the vertical direction, and a limiting groove 33. At this time, a driving force of the driving mechanism 3 on the short rebars or the short ribs in the vertical direction is an elastic force. Specifically, the limiting groove 33 has a lateral section of T-shape and a longitudinal section of L-shape, which has a vertical portion 331 extending in the vertical direction and a horizontal portion 332 extending in the horizontal direction. The third driving plate 32 has a plate body 321, and an extending portion 322 disposed on the side wall surface of the plate body 321 and extending towards the direction of the limiting groove 33, the extending portion 322 extending into the limiting groove 33 and slidably disposed along the vertical portion 331 and the horizontal portion 332, respectively. The third driving plate 32 is fixedly disposed at the bottom of the second elastic member 31, which has a natural state in which the third driving plate 32 is driven to extend into the discharging channel 514 in the vertical direction, and a contracted state in which the second elastic member 31 is compressed against the third driving plate 32 at its bottom and generates a second pressing force in a vertically downward direction on the third driving plate 32. When the second elastic member 31 is in the contracted state, the extending portion 322 of the third driving plate 32 is inside the horizontal portion 332 of the limiting groove 33 to block the third driving plate 32 from sliding vertically, thereby ensuring the position of the third driving plate 32 is limited; the third driving plate 32 is in the vertical portion 331 of the limiting groove 33 and slides along the vertical portion 331. When the second elastic member 31 is in the natural state, the short rebars or the short ribs are conveyed to the printed cement slurry layer driven by the third driving plate 32 and the second elastic member 31, and then the extended portion 322 is moved upward along the vertical portion 331 under external driving and slides laterally into the horizontal portion 332 for preparing a next reinforcement action. Optionally, the second elastic member 31 may be a spring.

Example 2

Figure 5:
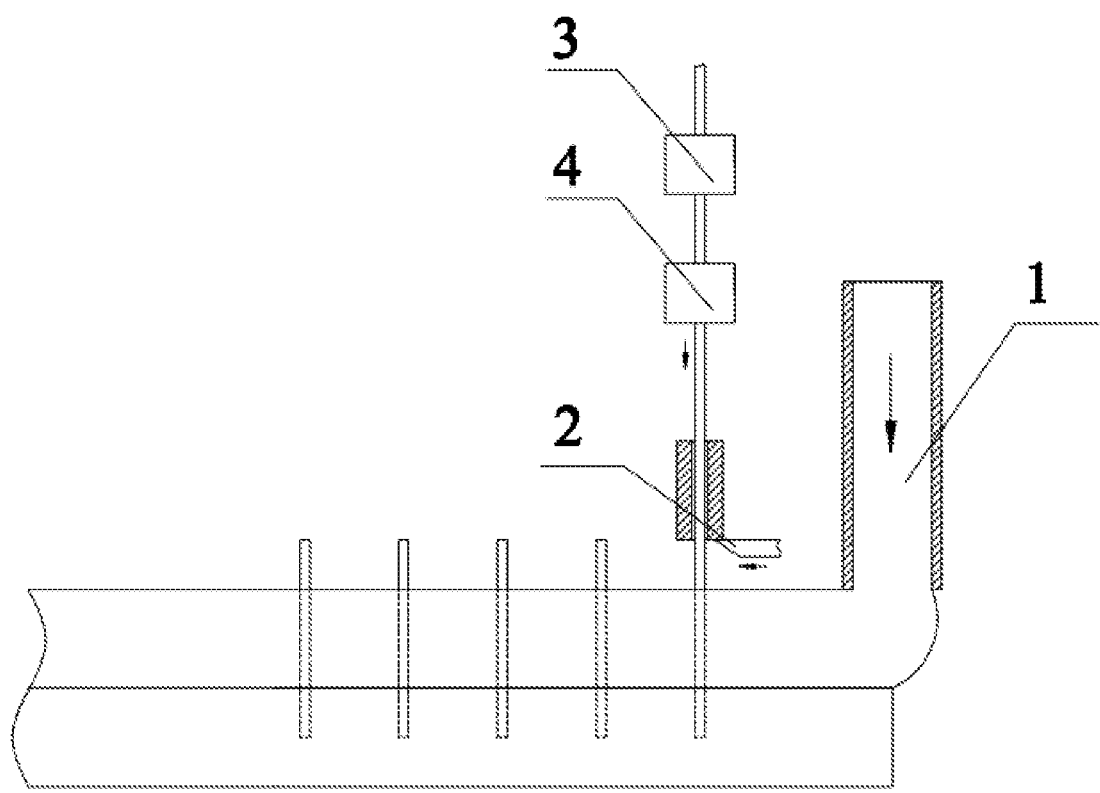
FIG. 5 is a schematic view of an apparatus for preparing building structure with 3D printing in example 2.
Figure 6:
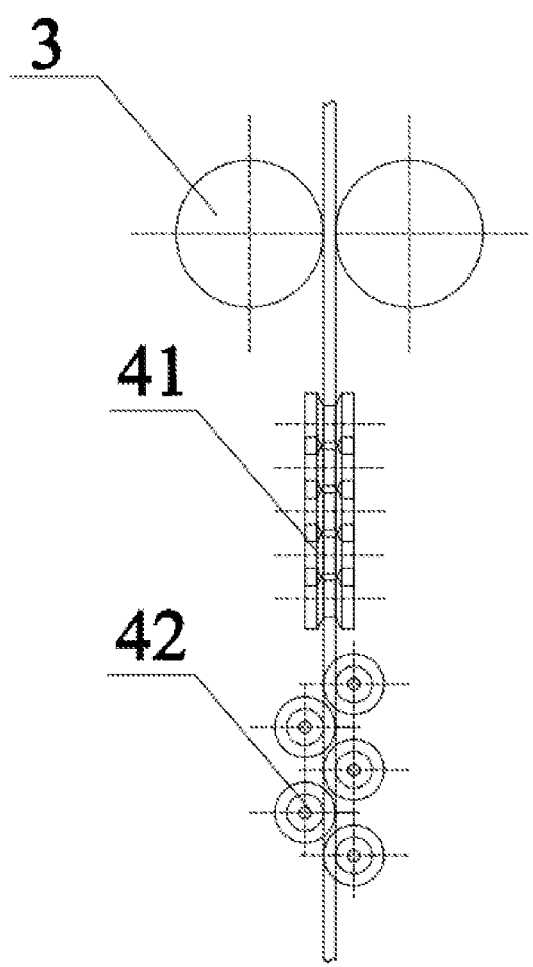
FIG. 6 is a schematic view of a driving mechanism cooperating with a straightening mechanism in the apparatus for preparing a building structure with 3D printing in example 2.

Example 2 provides an apparatus for preparing a building structure with 3D printing, as shown in FIGS. 5 and 6, comprising a 3D printing device 1 and a reinforcing device.

Compared with the apparatus for preparing a building structure with 3D printing provided in example 1, the apparatus provided in example 2 differs in that the reinforcing device is not provided with the temporary storage mechanism as example 1; in the apparatus for preparing a building structure with 3D printing provided by example 2, the reinforcing device includes an intersecting mechanism 4 and a cutting component 2.

Wherein, the cutting component 2 is used to cut long rebars or long ribs into short rebars or short ribs. The straightening mechanism 4 has a linear passage extending in the conveying direction of the long rebars or the long ribs and through which the long rebars or long ribs pass, to adjust a horizontality or verticality of the long rebars or long ribs. The cutting component 2 is disposed near the printing head 12 of the 3D printing device 1, and the straightening mechanism 4 is disposed ahead the cutting component 2. The rebars are usually set in a roll, and are driven by the driving mechanism 3 to move toward the cutting component 2 after passing the intersecting mechanism 4, wherein the driving mechanism 3 acts as a driving source for driving the rebars to move toward the direction of inserting the cement-based slurry layer to ensure that the output of the rebars is stable and continuous.

In the apparatus for preparing a building structure with 3D printing provided by example 2, as shown in FIG. 5, the cutting component 2 includes a sleeve 21 and a cutter head 22.

Wherein, the sleeve 21 is fixedly disposed relative to the driving mechanism 3 and extends vertically and through which the long rebars or long ribs pass vertically, for example, the sleeve 21 is fixed on a base frame. Driven by the first driver, the cutter head 22 is slidably abutted on a bottom end surface of the sleeve 21 for extending the long rebars or the long ribs along an axis perpendicular to the sleeve 21, that is, a horizontal transverse direction in FIG. 5. For example, the first driver is a linear motor that drives the cutter head to cut horizontally along the bottom transverse end of the sleeve 21.

In the apparatus for preparing a building structure with 3D printing provided by example 2, as shown in FIG. 6, the straightening mechanism 4 includes a first roller set and a second roller set sequentially disposed. The first roller set has a first roller 41 disposed oppositely and alternately; and the second roller set has a plurality of second rollers 42 disposed oppositely and alternately. An axis of the first roller 41 is perpendicular to that of the second roller 42. The linear passage is formed between the facing two of the first rollers 41 and between the facing two of the second rollers 42, and the long rebars or the long ribs are conveyed along the linear passage. The first roller set performs a first correction for the long rebars or the long ribs that extend into the linear passage, and the second roller set performs a second correction for the long rebars or the long ribs that extend into the linear passage. The axes of the two roller sets are disposed vertically to ensure that the straightness of the rebars can be adjusted in two mutually perpendicular directions and an axial direction perpendicular to the rebars, thereby achieving the best straightening effect. For example, five of the first rollers 41 and five of the second rollers 42 are relatively disposed in example 2.

In example 2, as shown in FIG. 5, the driving mechanism 3 is disposed in front of the straightening mechanism 4. The driving mechanism 3 is a pair of pulleys disposed oppositely, which rotate to meet each other halfway. The long rebars are transmitted between the two pulleys. As shown in FIG. 6, when the pulley on the left side rotates clockwise and the pulley on the right side rotates counterclockwise, the two pulleys will apply a tensile force to the long rebars or the long ribs in the vertical downward direction, so as to drive the long rebars or the long ribs to be conveyed downward. Further, the tangential line between the two pulleys is coaxially arranged with the linear passage to ensure high transmission synchronization of the long rebars or the long ribs, thereby improving the stability of the subsequent correcting and straightening action of the straightening mechanism 4.

Example 2 further provides a method for preparing a building structure with 3D printing, which is different from that provided in example 1 in that the original steps S31 and S32 are changed to the following steps.

S31: The long rebars or the long ribs enter between two pulleys in the vertical direction and are conveyed toward the straightening mechanism 4. The long rebars or the long ribs pass through the first and second roller sets, and then extend into the sleeve 21 of the cutting component 2, and move toward the direction perpendicular to the interlayer interface of the cement. When the length of the long rebars or the long ribs exceeding the bottom of the sleeve 21 reaches the preset insertion length of the short ribs, the first driver drives the cutter head 22 to move laterally, so as to cut the long rebars or the long ribs into the short rebars or the short ribs.

S32: On the $n^{th}$ layer of cement-based slurry layer, when the length of the long rebars or the long ribs exceeding one side of the sleeve 21 reaches the preset insertion length of the short ribs, that is to say the long rebars or the long ribs are at least inserted into the $n^{th}$ layer, ensuring that the height of the short rebars or the short ribs exceeding the top surface of the $n^{th}$ layer is smaller than the height of the printing head 12 when it prints the $(n+1)^{th}$ layer, the first driver drives the cutter head 22 to move laterally, so as to cut the long rebars or the long ribs into the short rebars or the short ribs that have been inserted into the interlayer interface of cement-based slurry layer.

As a first alternative embodiment, the number of the first roller 41 and the second roller 42 may be two, three, four, six or more respectively. For example, when there are two first rollers 41 disposed oppositely and alternately, the long rebars or the long ribs slide along a linear passage between the two first rollers 41, and are adjusted their straightness by contacting with the wall surface between the two rollers. Of course, no matter the first roller 41 or the second roller 42, the more the number of rollers is set, the better the adjustment of straightness will be.

As a second alternative embodiment, the driving mechanism 3 may also have a single pulley. The surface of the pulley is abutted against the long rebars or the long ribs. There is sliding friction between the pulley and the long rebars or the long ribs. When the pulley rotates, the long rebars or the long ribs can also be conveyed to the linear passage.

Example 3

Figure 7:
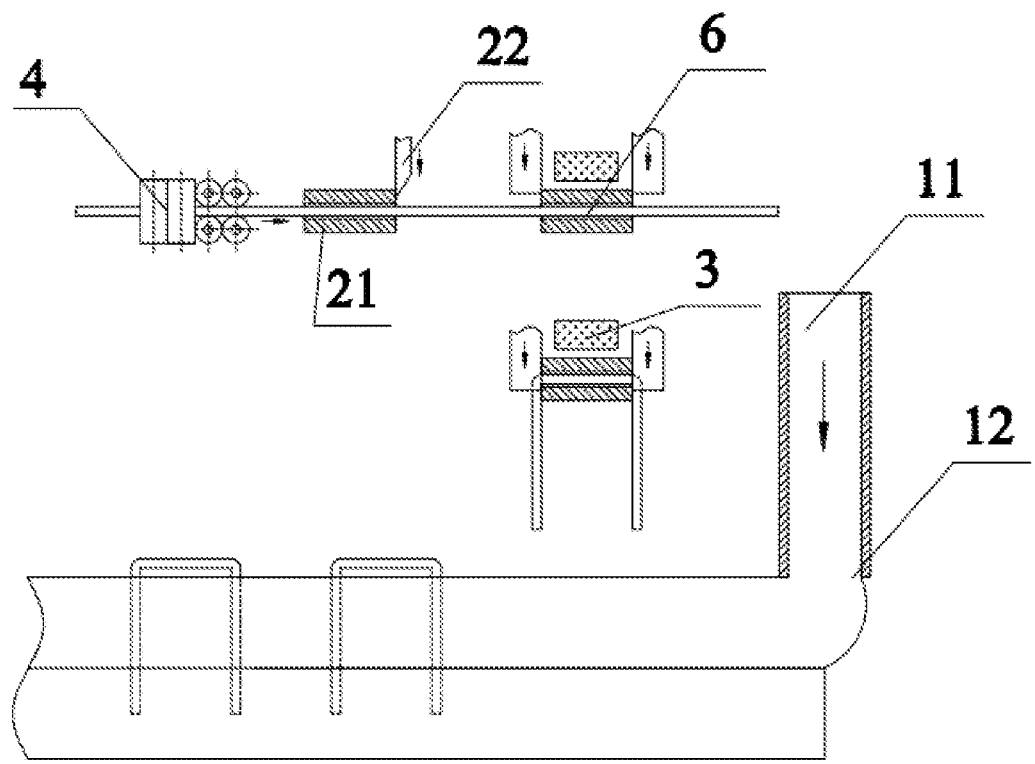
FIG. 7 is a schematic view of an apparatus for preparing a building structure with 3D printing in example 3.
Figure 9A:
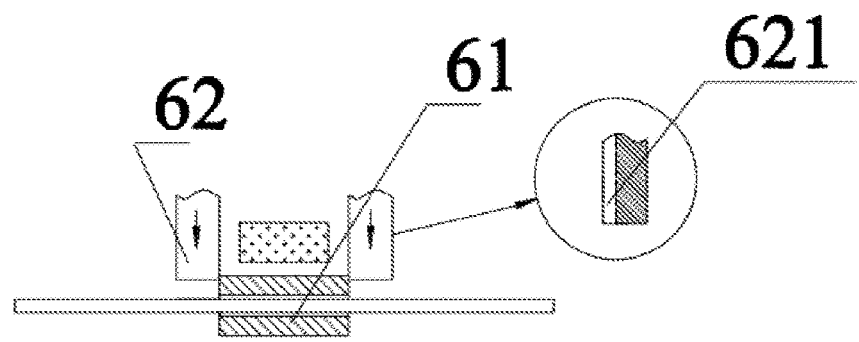
FIG. 9a is enlarged schematic view of a bending mechanism, and a cross-sectional view of a bending member, in example 3.
Figure 9B:
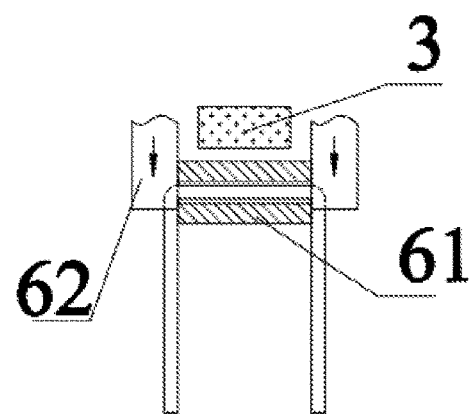
FIG. 9b is a schematic view of a bending mechanism bending short rebars or short ribs in example 3.

Example 3 provides an apparatus for preparing a building structure with 3D printing, as shown in FIGS. 7, 9a and 9b, comprising a 3D printing device 1 and a reinforcing device.

Compared with the apparatus for preparing a building structure with 3D printing provided in example 2, the apparatus provided in example 3 differs in that the straightening mechanism 4 and the cutting component 2 of the reinforcing device are disposed in a different position and direction, the driving mechanism 3 is disposed in a different form, in addition, the reinforcing device further includes a bending mechanism 6 and a feeding mechanism 7.

As shown in FIG. 7, the reinforcing device includes a driving mechanism 3, a straightening mechanism 4, a cutting component 2, a bending mechanism 6, and a feeding mechanism 7. Wherein, the feeding mechanism 7 is disposed ahead of the straightening mechanism 4 to drive the long rebars or the long ribs to be conveyed towards the straightening mechanism 4. The straightening mechanism 4 and the cutting component 2 are sequentially disposed in the order that the rebars extend, the relative position of them is the same as that in example 2. As shown in FIG. 7, the bending mechanism 6 is disposed after the cutting component 2, and is used to bend both ends of the short rebars or the short ribs cut by the cutting component 2 downward to form an inverted U-shape, and the driving mechanism 3 is used to drive the U-shaped short rebars or short ribs to perform an insertion movement.

Figure 8:
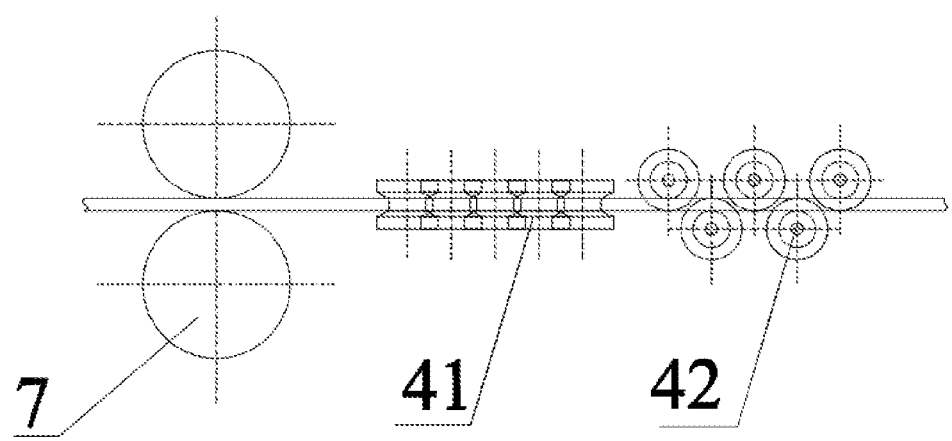
FIG. 8 is a schematic view of a straightening mechanism cooperating with a feeding mechanism in example 3.

Specifically, as shown in FIG. 7, the straightening mechanism 4 and the sleeve 21 of the cutting component 2 are all placed in the lateral direction, and the cutter head 22 is driven by the first driver to move in the vertical direction, and cuts the long rebars or the long ribs vertically to form short rebars or short ribs. In addition, as shown in FIG. 8, the feeding mechanism 7 is two pulleys disposed oppositely, which roll to meet each other half way. The long rebars or the long ribs passed through between the two pulleys. The long rebars or the long ribs set in a roll are conveyed in a horizontal direction under an action of an extruding force between the two pulleys. In an alternative embodiment, optionally, the pulley is made of an elastic material to ensure an elastic deformation of the pulley surface occurs when the long rebars or the long ribs are clamped, further ensuring the stability of clamping the rebars or the ribs. In this example, as shown in FIG. 8, the pulley disposed on the upper side rotates counterclockwise, the pulley disposed on the lower side rotates clockwise, and the long rebars or the long ribs are conveyed to the right side in the horizontal direction.

Specifically, the driving mechanism is a composite assembly of a fourth driver and a fourth driving plate and is provided in cooperation with the bending mechanism 6, for driving the short rebars or the short ribs to perform the insertion movement in the vertical direction. As shown in FIGS. 9a and 9b, the bending mechanism 6 in this example includes: a clamp 61, a bending member 62, and a second driver. The clamp 61 is used to clamp the short rebars or the short ribs, which extend over both sides of the clamp 61. There are two bending members 62, which are disposed on both sides of the clamp 61. The second driver is connected to the bending member 62, and used to drive the bending member 62 to press against both ends of the short rebars or the short ribs and perform a downward bending movement with respect to the middle of the short rebars or the short ribs clamped by the clamp 61, so as to form short rebars or short ribs that have a vertical section of an inverted U-shaped. For example, the second driver is a linear motor, which slides with the bending member 62 up and down by a slider fixed to a moving end of the linear motor.

Specifically, a receiving groove 621 with a slot facing the clamp 61 is provided on an end surface of each of the bending members 62 facing a side of the clamp 61; when the bending member 62 moves with the second driver, the receiving groove 621 is embedded with a bended portion of short rebars or the short ribs. The receiving groove 621 can be square grooves, circular grooves or semi-circular grooves, etc. to accommodate rebars or ribs of different shapes or sections such as square, circular, semi-circular.

A fourth driver is connected to a fourth driving plate. A bottom surface of the fourth driving plate abuts against a top surface of an inverted U-shaped short rebars or short ribs. The fourth driving plate is moved downward in the vertical direction under the driving of the fourth driver. For example, the fourth driver is a linear guide and a cylinder arranged side-by-side, and the fourth driving plate is disposed on the same side of the cylinder and the linear guide. The fourth driving plate is fixedly connected to an end of a piston rod of the cylinder and a slider disposed on the linear guide. The linear guide is used to ensure a linear movement of the fourth driving plate, and the cylinder is used to provide a power source for a vertical movement of the driving mechanism 3.

Example 3 further provides a method for preparing a building structure with 3D printing, which is different from that provided in example 1 in that the original steps S31 and S32 are changed to the following steps.

S31: The long rebars enter between two pulleys in the horizontal direction and are conveyed toward the straightening mechanism 4. The long rebars or the long ribs pass through the first and second roller sets, and then extend into the sleeve 21 of the cutting component 2 and extend into the clamp 61 of the bending mechanism 6. When the length of the long rebars or the long ribs exceeding the right side of the sleeve 21 reaches the preset insertion length of the short rebars or the short ribs, the pulley stops rotating, and the clamp 61 firmly clamps the rebars inserted therein. By this time, the first driver drives the cutter head 22 to move vertically to cut the long rebars or the long ribs into the short rebars or the short ribs. The clamp 61 clamps the middle portion of the short rebars or the short ribs, and the bending mechanism 6 disposed on both sides of the clamp 61 moves vertically downwards. Both sides of the short rebars or the short ribs are driven to bend downward under the action of bottom of the receiving groove 621, until the bending member 62 reaches the preset bending position.

S32: On the $n^{th}$ layer of cement-based slurry layer, the fourth driving plate drives the inverted U-shaped short rebars or short ribs to insert into at least the $n^{th}$ layer. It is ensured that a bottom surface of an inverted U-shaped middle portion abuts on a top surface of the $n^{th}$ layer of cement-based slurry layer, and a height of the short rebars or the short ribs on the top surface of the U-shaped middle portion is less than a height of the printing head 12 when the printing head 12 prints the $(n+1)^{th}$ layer.

In the step S32 of the example, it should be ensured that the bottom surface of an inverted U-shaped middle portion abuts on the top surface of the $n^{th}$ layer of cement-based slurry layer, preventing a printing gap between the bottom surface of the middle portion and the top surface of the $n^{th}$ layer of cement-based slurry layer, and there is no printing gap between the printed cement-based slurry layer and the inserted rebars, ensuring a tight connection between the cement slurry layer and the rebars, so that the mechanical properties and toughness of the interlayer interface between the cement-based materials of the 3D printing are truly improved, further improving the safety and stability of the building structure.

As a first alternative embodiment, the fourth driver in example 3 may also be an integration of a motor and a lead screw, or an integration of a hydraulic cylinder and a linear guide, as long as the driving mechanism 3 drives the short rebars or the short ribs to insert vertically into the cement-based slurry layer.

As a further modification, of course, a fourth driver and a fourth driving plate may not be provided. According to the alternative embodiment in example 1, the cooperation of the driving mechanism 3 and the bending mechanism 6 is performed by the cooperation of the elastic member, the limiting groove and the driving plate, as long as ensuring that the elastic member is replaced in time according to the required driving force for inserting the short rebars or the short ribs into two, three or more adjacent layers. For example, the elastic member may be a spring.

As a third alternative embodiment, the reinforcement mechanism may not be provided with a straightening mechanism 4. The straightening mechanism 4 may be designed for straightening only by two oppositely disposed pulleys, or the sleeve 21 may be straightened by the inner walls of which face the rebars; or when the long rebars or the long ribs have been straightened beforehand, the effect of the straightness of the long rebars or the long ribs on the printed building structure may be ignored.

As a fourth alternative embodiment, the bending member 62 may also be provided with only an extending member 62. The bending member 62 slides downward in the vertical direction to make the short rebars or the short ribs clamped in the clamp to perform a bending movement along the sliding direction of the bending member 62, so as to obtain short rebars or ribs which are bent in one side and have L-shaped longitudinal section, through the bending movement of the bending member 62. The L-shaped vertical portion vertically spans interlayer interface between at least two adjacent cement-based slurry layers under the action of the driving mechanism, so as to ensure the connection to the interlayer interface, and ensure that in the step S32, when the short rebars or the short ribs are inserted into the $n^{th}$ layer of the cement slurry layer, the top surface of the $n^{th}$ layer of the cement paste layer abuts on the bottom surface of the L-shaped horizontal portion to improve the tightness of the connection between the cement-based slurry layers, thereby improving the mechanical properties and toughness of the interlayer interface and improving the safety and stability of the building structure.

Example 4

Example 4 provides an apparatus for preparing a building structure with 3D printing, which is different from the apparatus for preparing a building structure with 3D printing provided by any one of examples 1 to 3, in that:

when the short rebars or the short ribs extend into an interlayer interface of the adjacent cement-based slurry layers, a driving mechanism drives the short rebars or the short ribs to insert into the cement-based slurry layer in an angle of 30 degrees, 60 degrees, 75 degrees, etc. with the interlayer interface.

Example 5

Example 5 provides an apparatus for preparing a building structure with 3D printing, which is different from the apparatus for preparing a building structure with 3D printing provided by any one of examples 1 to 4, in that:

as shown in FIG. 1, it is not provided with the temporary storage mechanism of example 1, the straightening mechanism 4 and the cutting component 2 of example 2, and the bending mechanism 6 of example 3, but only the driving mechanism 3 in example 1 is provided. The short rebars or the short ribs are placed one by one under the third driving plate to ensure that the short rebars or the short ribs are inserted and span the adjacent cement slurry layers printed on 3D printing apparatus.

It is apparent that the above embodiments are merely examples for clarity of illustration, and are not intended to limit the embodiments. Other variations or modifications in various forms may be made by those skilled in the art in view of the above description. There is no need and no way to present all of the embodiments herein. The obvious variations or modifications derived therefrom are still within the scope of protection of the present application.

The invention claimed is:

1. An apparatus for preparing a building structure with 3D printing, comprising:
   a 3D printing device, having a storage chamber and a printing head connected to the storage chamber and being movable relative to a base frame; and
   a reinforcing device comprising a cutting component having at least one cutter head for cutting a long rebar or long rib into a short rebar or short rib, movably arranged relative to the base frame and having one driving mechanism for driving a rebar or rib to perform a vertical insertion movement in a direction perpendicular to a stacking direction of a cement-based slurry layer; the driving mechanism vertically inserting the rebar or rib into an interlayer interface spanning at least two adjacent cement-based slurry layers printed by the 3D printing device, the rebar or rib being the long rebar or long rib before being cut by the cutting component and being the short rebar or short rib after being cut by the cutting component, wherein the cutting component further comprises: a sleeve fixedly disposed relative to the driving mechanism and through which the rebar or rib passes; and the cutter head, driven by a first driver, slides along an axis perpendicular to the sleeve and abuts on an end surface of the sleeve for extending the rebar or rib, wherein the reinforcing device further comprises a straightening mechanism having a linear passage extending in the conveying direction of the rebar or rib and through which the rebar or rib passes, to adjust a horizontality or verticality of the rebar or rib; and wherein the reinforcing device further comprises a bending mechanism for bending at least one end of the short rebar or short rib parallel to the stacking direction of the cement-based slurry layer, after cutting by the cutting component, towards the direction perpendicular to the stacking direction of the cement-based slurry layer, and the driving mechanism drives the short rebar or short rib bended to perform a vertical insertion movement; the bending mechanism comprises: a clamp, for clamping the short rebar or short rib; at least one of a bending member, disposed on one side of the clamp; at least one of a second driver, coupled to the bending member for driving the bending member to press against an end of the short rebar or short rib to perform a bending movement with respect to a portion of the short rebar or short rib clamped by the clamp, wherein a receiving groove with a slot facing the clamp is provided on an end surface of each of the bending members facing a side of the clamp; when the bending member moves with the at least one of the second driver, the receiving groove is embedded with a bended portion of the short rebar or short rib, wherein the bending mechanism comprises two bending members, separately disposed on two sides of the clamp.

2. The apparatus for preparing a building structure with 3D printing according to claim 1, wherein the reinforcing device further comprises a temporary storage mechanism;

the temporary storage mechanism has a storage cavity for arranging the short rebar or short rib extending along the direction perpendicular to the stacking direction of the cement-based slurry layer and slidably arranged in lines and in a direction parallel to the cement-based slurry layer; the storage cavity is provided with a feed port and a discharge port, and a retaining port opposite to the discharge port; and the driving mechanism extends into the retaining port to drive the short rebar or short rib sliding to the discharge port of the storage cavity out of the storage cavity to perform the insertion movement.

3. The apparatus for preparing a building structure with 3D printing according to claim 2, wherein the temporary storage mechanism comprises:

a casing, having the storage cavity;
a first driving plate, disposed in the feed port; and
a first elastic member, fixedly disposed with respect to the casing and coupled to the first driving plate; the first driving plate is pushed into the storage cavity by pressing of the first elastic member.

4. The apparatus for preparing a building structure with 3D printing according to claim 3, wherein the casing has a placement cavity with both ends arranged as the feed port and a first outlet respectively and being along a sliding direction of the short rebar or short rib; and a discharge channel communicated with the first outlet and extending vertically; the retaining port and the discharge port are arranged at a top and a bottom of the discharge channel, respectively;

the placement cavity and the discharge channel together define the storage cavity.

5. The apparatus for preparing a building structure with 3D printing according to claim 4, wherein the placement cavity is tilted downward from the feed port toward the first outlet.

6. The apparatus for preparing a building structure with 3D printing according to claim 1, wherein the straightening mechanism comprises a first roller set and a second roller set sequentially disposed;

wherein the first roller set has at least two first rollers disposed oppositely and alternately; the second roller set has at least two second rollers disposed oppositely and alternately; an axis of the first roller is perpendicular to that of the second roller, and the linear passage is formed between the two first rollers and between the two second rollers.

7. A method for preparing a building structure with 3D printing, comprising the steps of using the apparatus for preparing a building structure with 3D printing according to claim 1, and further comprising the following steps of:

S1: placing a cement-based slurry in a storage chamber of the 3D printing device;

S2: printing at least one layer of a cement-based slurry layer onto a substrate, as a printing head of the 3D printing device moves over the substrate;

S3: before the cement-based slurry layer is hardened, vertically inserting a rebar or rib into an interlayer interface spanning at least two adjacent cement-based slurry layers printed by the 3D printing device, by using a reinforcing device, in a direction perpendicular to a stacking direction of the cement-based slurry layer, such that the top of the rebar or rib may not exceed the top of the cement-based slurry layer where the rebar or rib are located, or a height H1 that the top of the rebar or rib exceeds the top of the cement-based slurry layer where the rebar or rib are located, is less than a layer height H0 that the 3D printing device prints a next layer of cement-based slurry layer;

S4: curing the cement-based slurry layer to form a building structure, wherein the method further comprises cutting a long rebar or long rib into a short rebar or short rib by using a cutting component, before or after the step S3;

wherein in the S3, the rebar or rib is the long rebar or long rib before being cut by the cutting component, and the rebar or rib is the short rebar or short rib after being cut by the cutting component, wherein the method further comprises bending both ends of the short rebar or short rib relative to a middle portion of the short rebar or short rib to form an inverted U-shape or an inverted L-shape, by using a bending mechanism, before the step S3; in the step S3, the inverted U-shaped or the inverted L-shaped short rebar or short rib are vertically inserted into the cement-based slurry layer, wherein the bending mechanism comprises two bending members, separately disposed on two sides of the clamp.

* * * * *